April 26, 1955   J. C. SLONNEGER   2,707,040
FRICTION CLUTCHES

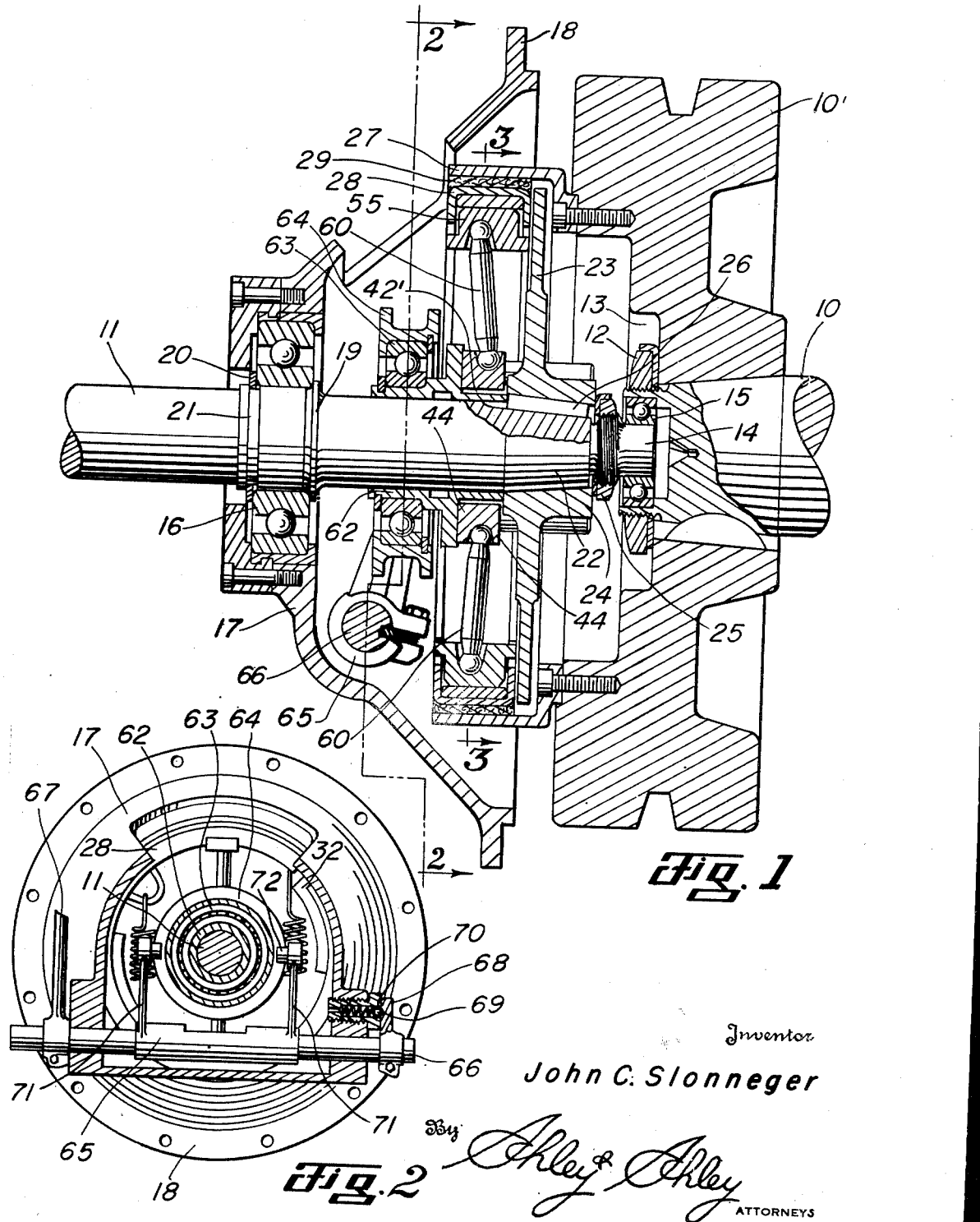

Filed Feb. 5, 1951   3 Sheets-Sheet 2

Inventor
John C. Slonneger
By Ashley & Ashley
ATTORNEYS

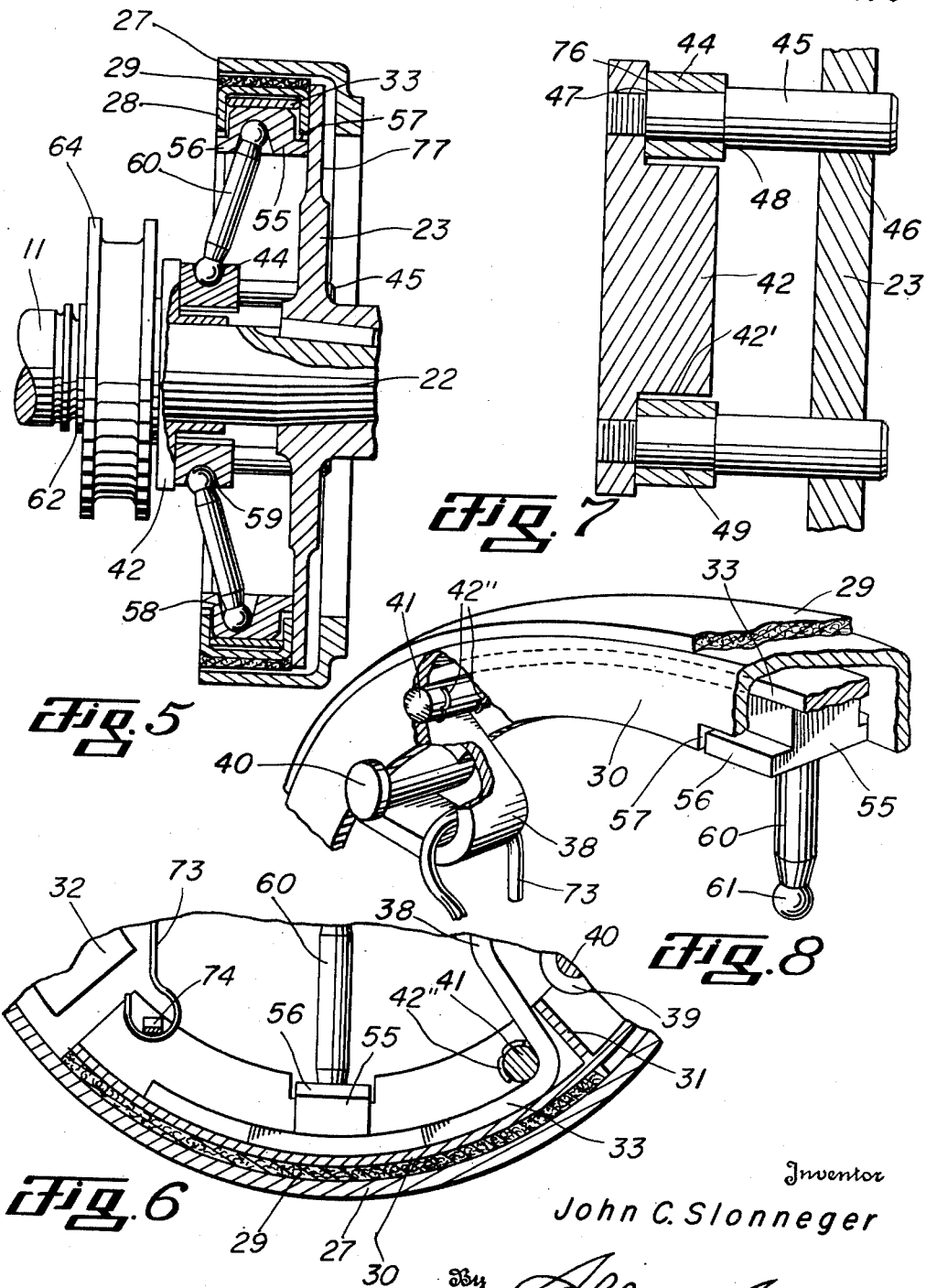

United States Patent Office 2,707,040
Patented Apr. 26, 1955

2,707,040
FRICTION CLUTCHES

John C. Slonneger, Dallas, Tex., assignor to The Continental Supply Company, Dallas, Tex., a corporation of Delaware Application February 5, 1951, Serial No. 209,467

14 Claims. (Cl. 192—76)

This invention relates to new and useful improvements in friction clutches.

The invention is particularly concerned with expanding shoe type friction clutches or couplings.

An important object of the invention is to provide an improved expanding shoe type clutch in which a more uniform pressure is applied upon the friction surfaces.

Another important object of the invention is to provide an improved expanding shoe type clutch adapted to couple a driving and a driven shaft and to provide torsional resilience between the coupled shafts.

A further object of the invention is to provide an improved device of the character described wherein is eliminated the necessity of adjusting the heel of the friction shoe to distribute and compensate for the wear of the friction surfaces.

A still further object of the invention is to provide an improved expanding shoe type friction clutch having a convenient and simple adjusting means for compensating wear of the friction shoes or other elements of the clutch, the means being readily accessible and easily manipulated.

Yet another object of the invention is to provide an improved clutch of the type described having a toggle mechanism for expanding the friction shoes and having provision for removing substantially all distorting stresses from the toggle mechanism whereby the same is protected against damage and failure.

A still further object of the invention is to provide an improved clutch of the type described having means for substantially eliminating wear in the toggle shifting mechanism.

A construction designed to carry out the invention will be hereinafter described together with other features of the invention.

Figure 3:
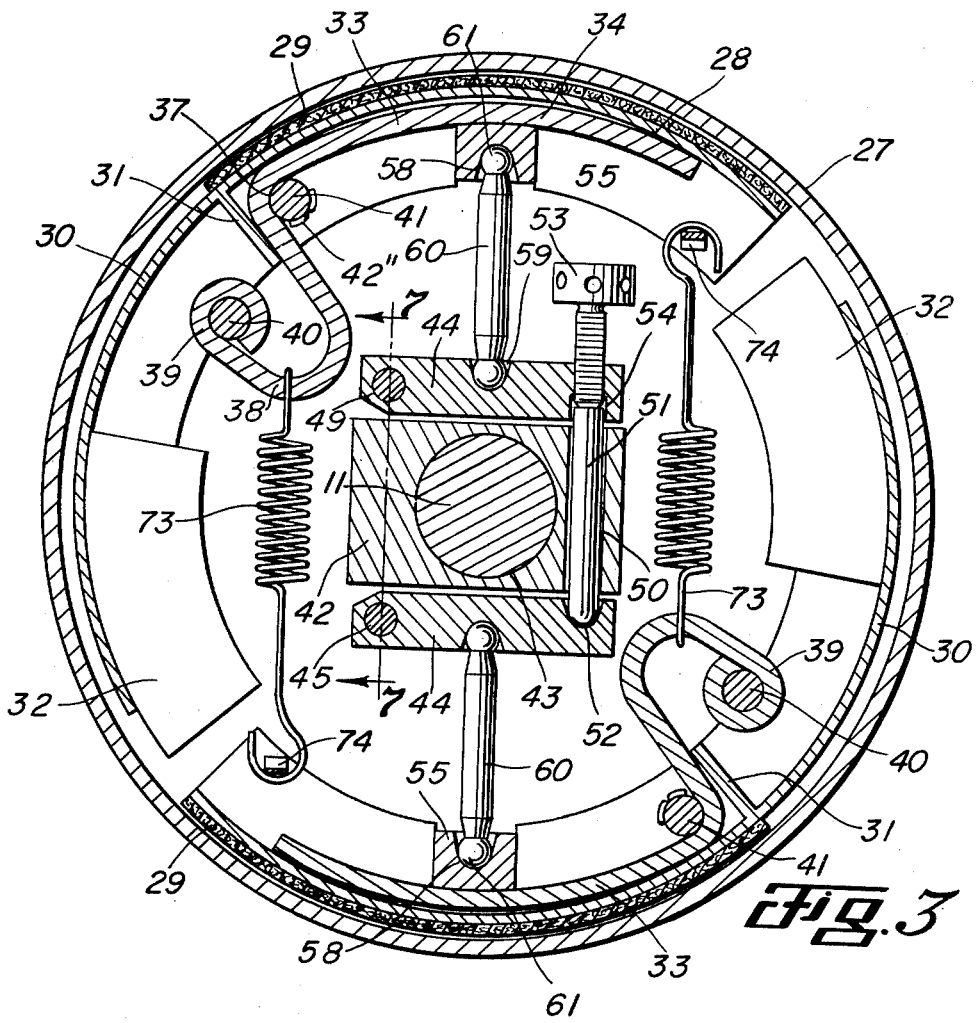
Figure 4:
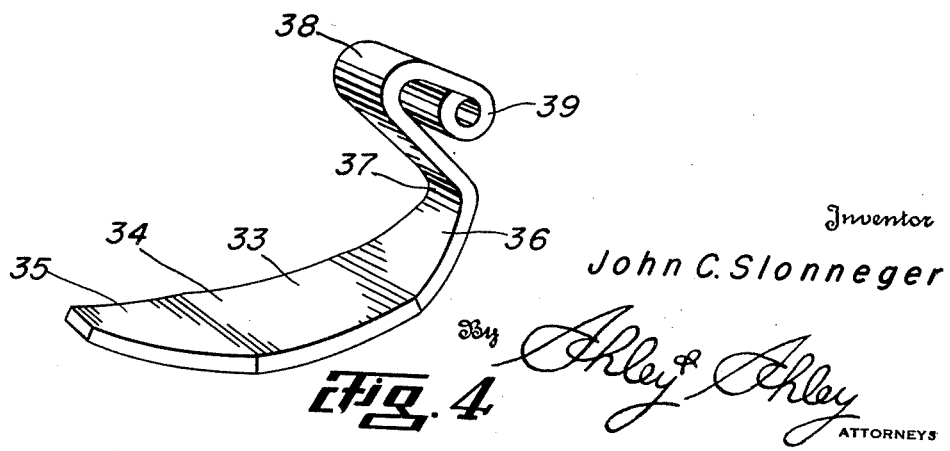

The invention will be more readily understood from a reading of the following specification and by reference to the accompanying drawings, wherein an example of the invention is shown, and wherein:

Fig. 1 is a vertical, sectional view of a clutch constructed in accordance with this invention showing the clutch engaged, Fig. 2 is a reduced, sectional view taken upon the line 2—2 of Fig. 1, Fig. 3 is an enlarged sectional view taken upon the line 3—3 of Fig. 1, Fig. 4 is a perspective view of one of the pressure springs for the clutch shoes, Fig. 5 is a fragmentary view similar to Fig. 1 and showing the clutch in a disengaged position, Fig. 6 is a fragmentary view similar to the lower portion of Fig. 3 and showing the clutch shoes engaged, Fig. 7 is a sectional view taken upon the line 7—7 of Fig. 3, and Fig. 8 is a fragmentary, perspective view, partially broken away, to illustrate the relationship of the pressure spring and the clutch shoe, and the engagement of the toggle mechanism with said shoe.

In the drawings, the numeral 10 designates a shaft carrying the usual fly wheel 10'. It is pointed out that the shaft 10 may be either a driving or a driven shaft since it is immaterial to this invention which portion of the clutch structure is carried by which shaft. For convenience, however, the shaft 10 will be referred to as a driving shaft, and its associated shaft 11 will be referred to as a driven shaft.

It is to be noted that the particular embodiment of the invention shown in the drawings is adapted for use on an internal combustion engine. The invention is not limited to such use, however, and may be modified considerably. The flywheel 10' is not essential. It may form an integral part of the clutch structure, may be reduced considerably in mass, or may be eliminated entirely. Further, the manner of supporting the shafts 10 and 11 is immaterial and may take any suitable form convenient to the structure of the associated machines.

The features of the invention are brought out in the claims appended hereto and obviously various changes in the structure of the invention may be made within the scope of said claims.

The shaft 10 is suitably secured within the fly wheel 10' by a nut 12 and being received in a suitable recess or bore 13 formed in the side of the fly wheel 10'. The inner end of the shaft 11 is reduced in diameter to form a pin 14 which is received within a suitable bearing 15 recessed within the end of the shaft 10. The outer portion of the shaft 11 is supported in a bearing 16 mounted in a conventional fashion in the outer portion of a bell housing 17. The housing 17 carries an external annular flange 18 by which it may be secured in any suitable fashion to a fly wheel housing (not shown) or other supporting member. An external shoulder 19 is formed on the shaft 11, the shoulder abutting the inner side of the bearing 16, while a snap ring 20 abuts the outer side of the bearing 16 and engages within a groove 21 cut in the shaft 11. The shaft is thus anchored securely against axial or endwise movement with respect to the bearing 16 and with respect to the housing 17.

The innermost end of the shaft 11 adjacent to the pin 14 is tapered to form a beveled face 22, and a backplate 23 has a hub 24 receiving the face or beveled portion 22 of the shaft. A lock nut 25 is screwed on the shaft 11 over the pin 14 and holds the backplate in position. A suitable key 26 prevents rotation of the plate upon the shaft and unites the backplate and shaft in a rigid structure.

A cylindrical clutch drum 27 is bolted or otherwise suitably secured to the fly wheel 10', the drum surrounding the backplate 23 and projecting an appreciable distance toward the smaller end of the housing 17 from said backplate. It is apparent that the drum 27 will revolve with the fly wheel 10' and the shaft 10, while the backplate 23 revolves with the shaft 11.

A pair of arcuate clutch shoes 28 are disposed within the clutch drum 27, each of the shoes carrying a suitable friction lining 29 affixed thereto and adapted to engage the inner periphery of the drum.

Each of the clutch shoes includes an arcuate channel member 30 having a squared U cross section and extending almost half way around the inner periphery of the drum 27 (Fig. 3). The radius of curvature of the frame members 30 is slightly less than the radius of curvature of drum 27 so as to permit the concentric positioning of the shoes within said drum, and the friction lining 29 is suitably affixed upon the outer periphery of the element 30 so as to be disposed between said element and the inner surface of the drum. The lining 29 extends from one end of the element 30 to approximately its medial position, and a transverse partition or stop 31 extends across the inside of the channel member 30 near this medial point. A counterbalance weight 32 is carried upon the opposite end of each of the frame elements 30.

For urging the shoe outwardly into engagement with the drum 27, an arcuate spring 33 is provided, the spring including, as shown in Fig. 4, an elongate leaf section 34 of gentle curvature and of greatest width at its center section. The leaf portion 34 tapers in width toward its ends as shown at 35 and 36. The spring is bent toward the concave portion of the section 34 at the end 36 of said section, the bend being relatively sharp and forming an inside corner 37 of relatively sharp curvature. The reduction in width of the spring continues from the portion 36 around the corner 37 and into the portion of the spring projecting from said corner.

At a point spaced from the corner 37, the spring is again bent upon itself, this time away from the concave side of the portion 34 so as to form a substantially U shaped section 38. The corner 37 is situated at the end of one leg of the U, and the end of the opposite leg is rolled upon itself to form a cylindrical socket 39. The spring increases in width from the bottom of the U 38 to the socket 39, the latter being of substantially the same width as the central portion of the section 34, both being of such a width as to fit nicely within the channel member 30.

As shown in Fig. 3, the curvature of the section 34 is slightly less than that of the element 30 so that the entire surface of the leaf portion 34 does not conform to or abut the inner surface of the channel 30. The sockets 39 of the springs receive suitable pins 40 secured in and extending from the backplate 23 at diametrically opposed points, and the corners 37 of the springs pass over pins 41 removably secured in the sides or flanges of the channels 30 by suitable fastening means such as the cotter pins 42''. The longer leg of the U shaped section 38 is confined between the pins 41 and the partitions 31, and hence the springs are held against circumferential shifting within the channel members 30 by abutment with the partitions 31 and the pins 41.

The U shaped sections of 38 constitute resilient sections by reason of the material of manufacture and the configuration of the springs 33, and it is to be noted that one leg of the U shaped section is secured to the backplate 23 by the pins 40, while the other leg of the sections is secured to the friction shoes 28 by confinement within the channel members 30 between the partitions 31 and the pins 41. Thus, as will appear more fully hereinafter, when the shoes 28 are engaging the drum 27 and torsional loads are being transmitted from the shaft 10 to the shaft 11, there is provided in the connecting linkage or clutch the resilient sections 38 which absorb and eliminate any sudden torsional shocks and thus protect both the clutch structure and the devices with which it is associated.

For controlling the engagement and disengagement of the friction shoes with the drum 27, there is provided a substantially rectangular shifter block 42 having a central transverse bore 43 for receiving the shaft 11. The block is confined upon said shaft between the hub 24 of the backplate 23 and the shoulder 19 formed on said shaft. The upper and lower portions of the block 42 are cut away upon the side of the block facing the hub 24 to form recesses 42', and toggle adjusting levers 44 are disposed in said cutaway portions or recesses. As shown in Figs. 3 and 7, a pair of mounting pins 45 are secured in the block 42 in vertical alignment and spaced laterally to one side of the bore 43. The pins 45 extend from the cutaway portions of the toggle block through openings 46 cut in the backplate 23 and hence hold the toggle block against rotation with respect to said backplate. Further, the pins 45 are reduced in diameter within the cutaway portions of the toggle block to form bearing faces 47 and shoulders 48. The toggle adjusting arms 44 have bores 49 at one end, the bores receiving the bearing portions 47, and the shoulders 48 retaining the arms in position within the cutaway portions of the block 42. Hence, the arms are pivoted for swinging in a vertical arc, but are secured to the block 42 and will move longitudinally of the shaft 11 with said block.

A vertical opening 50 is provided in the opposite end of the block 42, offset laterally to one side of the bore 43, and an adjusting pin 51 extends through said opening. As shown in Fig. 3, the pin 51 is of greater length than the opening 50 and projects downwardly into a recess 52 formed in the lower arm 44. A screw threaded adjusting bolt 53 extends vertically through the upper arm 44 in alignment with the opening 50 and has its lower end projecting into a counterbore 54, formed in the lower face of the upper arm 44 and receiving the upper end of the pin 51. It is obvious that by rotation of the adjusting bolt 53, the arms 44 may be caused to pivot about the pins 45 so that the opposite ends of said arms move apart, or move together, depending upon the direction in which the bolt 53 is rotated.

Each of the channel elements 30 of the friction shoes 28 receives a saddle block 55 between its flanges, the blocks bearing against the center section of the leaf portion 34 of the springs 33. Lateral flanges 56 are formed upon the blocks 55 and have a loose fit within notches 57 cut in the outer edges of the flanges of the elements 30. With this arrangement, the blocks 55 are held against circumferential movement with respect to the elements 30, but are free to move radially between the flanges of said elements. A recess 58 is formed in the outer face of each of the blocks 55, the recesses having semi-spherical bottoms. Similar recesses 59 are formed in the outer faces of the arms 44 in vertical alignment with the recesses 58, and all of the recesses 58 and 59 being in vertical alignment with the axis of the shaft 11. Toggle pins 60 extend between the arms 44 and the blocks 55 and have semi-spherical or ball-like projections 61 upon each end. The projections 61 are received in the recesses 58 and 59 and bear against the spherical bottoms thereof. It is obvious that longitudinal shifting of the block 42 upon the shaft 11 will cause the pins 60 to function as toggle pins and to force the blocks 55 outwardly against the springs 33, or to permit such blocks to be retracted.

For shifting the block 42 lengthwise upon the shaft 11, the block carries an integral cylindrical sleeve 62 extending along the shaft 11 from the bore 43 toward the shoulder 19, the bore of the sleeve 62 forming a continuation of the bore 43. A suitable bearing 63 is secured upon the sleeve 62, and a grooved shifter collar 64 is secured upon the outer periphery of the bearing 63. It apparent that shifting of the collar 64 axially of the shaft 11 will cause similar shifting of the block 42. A shifter fork or yoke 65 is mounted within the housing 17 for shifting the collar and toggle structure longitudinally of the shaft 11, the fork being carried upon a shaft 66 journaled transversely of the housing beneath the shaft 11. The ends of the shaft 66 project exteriorly of the housing 17, a suitable shifting lever 67 being secured upon one projecting end of the shaft, and a short poppet lever 68 being secured upon the opposite end of the shaft. The lever 68 carries a recess 69 upon its inner face, and a spring-pressed ball 70 is mounted on the housing 17 so as to engage said recess and hold the lever 68 and shaft 66 in a predetermined rotational position.

The fork 65 carries a pair of arms 71 projecting on each side of the shaft 11 and having inwardly directed trunnions 72 which engage within the groove of the collar 64. It is manifest that movement of the lever 67 will cause rotation of the shaft 66 and swinging of the arms 71 so as to move the collar 64 and the entire toggle structure longitudinally of the shaft 11. In the disengaged position of the clutch and the toggle structure (Fig. 5), the outer end of the sleeve 62 abuts the shoulder 19, and the toggle pins 60 are disposed at an appreciable angle with respect to the vertical line passing through the sockets 58 of the saddles 55. In this position, no appreciable load is being applied to the springs 33, and the friction linings 29 are not being held in snug engagement with the drum 27. For the purpose of holding the shoes from incidental engagement with the drum which would cause undue wear of the friction linings, a pair of coiled springs 73 are connected to the portions 38 of the springs 33, and the opposite ends of the springs 73 engage over hooks 74 carried upon the free ends of the clutch shoes so as to constantly urge said shoes from engagement with the drum 27. Therefore, when the clutch is in the position shown in Fig. 5, and the toggle pins 60 are not urging the clutch shoes outwardly, the springs 73 function to maintain said shoes in a retracted position and to keep the ball like projections 61 of the pins 60 in engagement in the recesses 58 and 59.

As the collar 64 and the block 42 are shifted axially along the shaft 11 toward the backplate 23, the toggle pins 60 assume an upright position and then pass slightly past such upright position as shown in Fig. 1. In this engaged position of the clutch, the block 42 abuts the hub 24, and since the pins 60 have moved past their vertical position, the toggle mechanism becomes self locking to hold the clutch in an engaged position. The toggle action of the pins 60 forces the saddles 55 outwardly against the central sections of the leaf portions 34 of the springs 33, and the springs in turn, urge the members 30 outwardly and hence force the friction linings 29 into engagement with the inner surface of the drum 27. As stated hereinbefore, assuming shaft 10 is the driving shaft, torque is thus transmitted from the drum 27 through the friction shoes to the partition 31 and the pin 41, and through the U shaped sections 38 of the springs 33 to the pin 40 and thence to the backplate 23 and the shaft 11. It is to be noted that the flanges of the channel members 30 are suitably notched at 75 to permit ample clearance for the pins 40.

The shape and the relative dimensioning of the springs 38 is of great importance in contributing to the improved performance of this clutch. As pointed out hereinbefore, the center section of the leaf portion 34 of the spring 33 is the point of greatest cross section of the spring and therefore its greatest section modulus. The leaf portion is tapered toward its outer ends 35 and 36, and is also tapered from the corner 37 and the socket 39 toward the bottom of the U-shaped section 38. In its relaxed state, the spring leaf section 34 has a radius of curvature greater than the radius of the inner surface of the channel member 30. The relation between these radii and the width and thickness of the leaf section 34 are so selected as to require a force equal to the total desired shoe pressure to cause the spring leaf section 34 to deflect and to conform to the inside radius of the member 30 when such force is applied to the saddle 55. It is further to be noted that the saddle blocks 55 are so positioned as to exert such force upon the middle section of the portion 34. The tapered ends 35 and 36 of the leaf section 34 are so designed that in its deflected position when the clutch is engaged, the leaf section exerts a nearly uniform force against the inside of the member 30 and thus against the friction lining 29 along the entire length of contact between the leaf section of the spring and the friction shoe. Therefore, an even pressure upon the friction linings 29 is obtained without the use of an expensive and complex structure which normally has been resorted to in an effort to obtain great rigidity in the friction shoes to avoid uneven wear. Since the friction lining 29 is backed up throughout a major portion of its length by the leaf section 34, and since the section is so devised as to apply a uniform pressure, the channel element 30 becomes merely a retaining means and need not withstand great structural stresses.

In explaining the action of the clutch, it is assumed that the adjusting screw 53 has been so adjusted that when the clutch is in the engaged position, the saddle blocks 55 will be forced outwardly sufficiently to just cause the spring leaf section 34 to have full contact with the shoe 28 as described hereinabove. In this condition, the spring section 34 will exert substantially uniform pressure upon the shoes 28 which, in turn, produce a substantially uniform pressure between the friction linings 29 and the clutch drum 27. Hence, any rotation of the drum 27 will cause a driving force, limited by the friction between the drum and the linings 29, to be transmitted to the shoes 28, hence to the pins 41 if rotation is counterclockwise, or to the partitions 31 if rotation is clockwise. From either the pins 41 or the partitions 31, the rotating force is applied to the spring 33, hence through the resilient section 38 to the anchor pins 40, thence to the backplate 23 and finally to the shaft 11. It is to be observed that the toggle pins 60, having the spherical extensions 61 at their extremities, will permit a small angular displacement of the shoes 28 with respect to the block 42 and the arms 44 without seriously relieving the pressure exerted by the arms 44 and without causing bending or eccentric loading of the toggle pins. This small angular displacement is quite proportional to the resistance of the extraneous torque load imposed upon the shaft 11 and the relationship of such load to the resilience of the U sections 38 hereinbefore described. Hence, the shoes may undergo some angular or circumferential shifting without damaging or impairing the action of the toggle mechanism, but such displacement is limited by a selected clearance between the recesses 75 and the pins 40.

From the above description it is apparent that the unique structure and arrangement, along with the disposition of the springs 33 accomplish a very desirable uniform pressure upon the friction linings and allow a certain amount of torsional resilience for absorbing shock. In practice, it is not possible to achieve perfect concentricity between the drum 27 and the backplate 23. The usual allowance for such eccentricity is of the order of five thousandths of an inch. Such an amount of eccentricity would be easily compensated for by the equalizing effect through the equalizing or adjusting pin 51 in conjunction with the torsional resilience provided by the sections 38 as described. In the common shoe type of clutch where engagement of the clutch depends upon rather minute deflections of relatively rigid members, small eccentricities between the corresponding driving and driven members causes undue bearing pressures and shaft deflections. As pointed out above, radial loads upon the shaft 11 and its bearings would be extremely small with the present invention, since the normal expected eccentricity of the driving and driven members of the clutch is taken care of through the adjusting or equalizing pin 51.

It will readily be seen that the springs 73 constantly exert a contracting pressure upon the shoes 28 and upon the springs 33 which, in turn, exert an inward pressure upon the blocks 55 and the pins 60. Inward pressure is thus exerted through the pins 60 upon the arms 44 and finally to an equalized pressure upon the equalizing pin 51. It is clear that with this constant inward pressure, all "lost motion" due to clearance in fits, is taken up and the shoe expanding toggle mechanism is held in close-coupled arrangement by means of the springs 73.

In disengaging the clutch, the operating lever 67 is moved outwardly to revolve the shaft 66 and to swing the arms 71 toward the shoulder 19. The forces involved in moving the toggle pin 60 from their self-locking position, as shown in Fig. 1, are quite small since the toggle pins are only slightly past their vertical position. After the pins have passed their vertical position the toggle mechanism is forced to its outer or disengaged position by the action of the springs 73 and the stored energy in the springs 33. In this disengaged position, the outer end of the sleeve 62 is held against the shoulder 19 by the action of the enumerated springs, and the yolk 65 is not called upon to hold the clutch in a disengaged position.

It is to be noted that the cutaway recesses 42' of the block 42 provide machined vertical surfaces 76 (Fig. 7) against which the arms 44 bear. Further, the backplate 23 has its marginal portion extending into close proximity with the inner periphery of the drum 27, and the marginal portion of the backplate is machined to provide a smooth surface 77 against which the saddle blocks 55 engage. This arrangement is of importance when the clutch is being engaged. When pressure is applied to the collar 64 by the yoke 65, and the block 42 is urged towards the backplate 23, the angularity of the toggle pins 60 forces the arms 44 against the smooth machined surface 76, and the pins 60 are thus relieved of forces tending to bend the pins in a direction parallel with the shaft 11. These bending forces are also removed from the equalizing pin 51. Because of this same angularity of the toggle pins 60 as the clutch is being engaged, the saddle blocks 55 are also forced against the machined surface 77, thus protecting the pins 60 against the applying of any bending moment due to the action of the shifter or toggle mechanism, with the net result that the pins 60 are subjected to axial stress only. Furthermore, the friction shoes 28 are squarely aligned with the clutch drum 27. One of the difficulties with shoe type clutches has been to secure square alignment between the friction shoes and the clutch drum when engaging the clutch because the reaction of the toggle mechanism tended to force the shoes out of alignment. In some designs, the shoe is guided by a plain surface on the clutch drum, but due to slippage while being engaged, wear soon destroyed this alignment. It is apparent that in this invention there is no slippage in the angular direction, but only the slight travel of the shoes 28 in a radial direction with respect to the backplate 23. This travel could cause wear but since the total travel is quite small the wear would be practically nil.

As the block 42 is forced more and more to the backplate 23, each of the friction linings 29 comes into contact with the clutch drum 27 at some point. It is to be noted that the reaction of the outward pressure of one friction shoe must be counteracted by the reaction of the other shoe through the arms 44 and the equalizing pin 51. Because of the flexibility of the springs 33, the friction linings are forced into full contact with the clutch drum as the motion of the block 42 toward the backplate 23 continues. Thereafter, the springs 33 are deflected until they have full contact with the inner surface of the channel member 30, as previously described.

As pointed out hereinabove, the toggle pins 60 go past their vertical position when the clutch is engaged, thus locking the clutch in its engaged position. In this position, the poppet lever or arm 68 is so adjusted as to hold the shifter fork 65 in a "free" position as soon as the operating lever is relieved of extraneous force. By the "free" position it is meant that the trunnions 72 of the shifter fork 65 are so positioned as not to touch any portion of the shifter collar 64. The diameter of the trunnions 72 is less than the width of the groove in the collar 64, and the poppet arm 68, being positioned by the engagement of the ball 70 in the recess 69, holds the trunnions in the center of said groove so that there is no wear between the trunnions and the walls of the groove. Thus, the collar 64 is free to rotate with the sleeve 62, and wear between the trunnions and the collar is eliminated.

This feature is important and believed to be novel. Not only is friction and wear substantially eliminated, but undesirable chatter and the frictional load upon the shaft 11 are reduced.

The foregoing description of the invention is explanatory thereof and various changes in the size, shape and materials, as well as in the details of the illustrated construction may be made, within the scope of the apppended claims, without departing from the spirit of the invention.

What I claim and desire to secure by Letters Patent is:

1. In a friction shoe type clutch having a clutch drum, friction shoes adapted to be moved into engagement with the drum, the improved toggle mechanism including, a toggle shifter block, arms having one end pivotally mounted on the shifter block, toggle pins extending between the medial portions of the arms and the friction shoes, and an adjustable equalizing member extending between the free ends of the arms for adjusting the displacement of the arms relative to one another so as to vary the load applied to the friction shoes by the toggle pins.

2. In a friction shoe type clutch having a clutch drum, friction shoes adapted to be moved into engagement with the drum and a toggle mechanism for shifting the shoes into engagement with the drum, the improved toggle mechanism including, a toggle shifter block having a smooth lateral surface, arms pivotally mounted upon the block so as to swing in a vertical arc parallel to said surface, the arms bearing laterally against said surface, toggle pins extending between the arms and the friction shoes, and an adjustable equalizing member extending between the arms for adjusting the displacement of the arms relative to one another so as to vary the load applied to the friction shoes by the toggle pins.

3. A friction shoe type clutch including, a driven member, a driving member, one of said members being a clutch drum, the other member being a back plate having a smooth lateral face, a shaft carrying one of said members, a toggle block on said shaft, friction shoes bearing against the smooth lateral face of the backplate and adapted to engage the clutch drum, arms pivotally mounted on the toggle block, toggle pins extending between said arms and the friction shoes for forcing said shoes into engagement with the clutch drum, and means on the toggle block for adjusting the displacement of the arms relative to one another.

4. In a friction shoe type clutch having a backplate and a clutch drum, arcuate friction shoes adapted to be moved into engagement with the clutch drum, and a toggle mechanism for so moving the shoes, means connecting the shoes to the backplate, and arcuate leaf springs interposed between the shoes and the toggle mechanism, said springs having a radius of curvature greater than that of the friction shoes and tapering in cross-sectional area from their medial portions to their extremities.

5. In a friction shoe type clutch as set forth in claim 4, wherein the means for connecting the shoes to the backplate are resilient members.

6. In a friction shoe type clutch having a backplate member and a clutch drum, arcuate friction shoe members adapted to be moved into engagement with the clutch drum, and a toggle mechanism for so moving the shoe members, means connecting the shoe members to the backplate member, and arcuate leaf springs interposed between the shoe members and the toggle mechanism, said springs having a radius of curvature greater than that of the friction shoe members and tapering in cross-sectional area from their medial portions to their extremities, the means connecting the shoe members to the backplate member being spring elements connected loosely to one of the members and tightly to the other.

7. In a friction shoe type clutch as set forth in claim 4, wherein the means for connecting the shoes to the backplate are U-shaped spring elements.

8. In a friction shoe type clutch as set forth in claim 4, wherein the means for connecting the shoes to the backplate are U-shaped spring elements pivotally connected to the backplate and having a loose connection with the friction shoes whereby said shoes may undergo limited circumferential movement.

9. In a friction shoe type clutch as set forth in claim 4, wherein the means for connecting the shoes to the backplate are U-shaped extensions of the leaf springs, one leg of the extensions being pivotally connected to the backplate and the other leg joining the leaf springs in an arc of short radius, the friction shoes having transverse pins embraced by said arc and transverse stops abutting the convex side of said arcs.

10. A friction shoe type clutch including, a driven member, a driving member, one of said members being a clutch drum, the other member being a backplate, a shaft carrying one of said members, a toggle block on said shaft, friction shoes adapted to engage the clutch drum, arcuate leaf springs engaging the shoes, saddle blocks engaging the medial portions of the leaf springs, toggle pins extending between the toggle block and the saddle blocks for forcing the friction shoes into engagement with the clutch drum, said leaf springs having a radius of curvature greater than that of the friction shoes and being of greatest width at their medial portions and tapering toward each extremity, a U-shaped integral extension from one extremity of each leaf spring projecting substantially at right angles to the leaf spring toward the toggle block, pins on the backhplate receiving the free ends of the extensions, said extensions increasing in width from their point of joining to the leaf springs to said pins, and securing means carried by the friction shoes and engaging the extensions for holding the shoes against appreciable circumferential movement relative to the leaf springs.

11. In a friction shoe type clutch as set forth in claim 1, wherein the arms are pivotally mounted on pins extending from the shifter block, a backplate carrying the friction shoes, and said pins having sliding engagement with the backplate to prevent circumferential movement between the backplate and the shifter block.

12. In a friction shoe type clutch having a housing, a clutch drum, friction shoes adapted to be moved into engagement with the drum, and a toggle mechanism in the housing for shifting the shoes into engagement with the drum, the toggle mechanism including a shifter block, a collar rotatably connected to the block for shifting the same, said collar having an annular groove, and a shifter yoke having trunnions engaging in said groove for shifting the collar and the shifter block axially, said yoke being pivotally mounted on the housing and having operating means, the improvement which includes resilient means carried by the housing and engageable with the yoke in one position of the latter to hold the trunnions disposed centrally of the collar groove and reduce wear of the trunnions and the collar.

13. A friction shoe type clutch including, a clutch drum, a backplate, friction shoes movably mounted upon the backplate so as to be capable of radial movement toward the clutch drum and circumferential movement in response to torque transmitted between the drum and the backplate, means for moving the shoes into and out of engagement with the clutch drum, and resilient torque transmitting spring-like elements for resiliently transmitting torque between the shoes and the backplate and forming the sole connection therebetween.

14. A friction shoe type clutch including, a driven member, a driving member, friction shoes movably mounted upon one of the members so as to be capable of movement toward the other member and circumferential movement in response to torque transmitted between the driving and driven members, means for moving the shoes into and out of engagement with said other member, and resilient torque-transmitting U-shaped elements for resiliently transmitting torque between the shoes and the member upon which the shoes are mounted, said elements forming the sole connection between the latter member and the shoes.

References Cited in the file of this patent

UNITED STATES PATENTS

| Number | Name | Date |
|---|---|---|
| 442,076 | McBride et al. | Dec. 2, 1890 |
| 780,482 | Duryea | Jan. 17, 1905 |
| 822,034 | Wright | May 29, 1906 |
| 1,656,189 | Fejes | Jan. 17, 1928 |
| 1,794,348 | Chase | Feb. 24, 1931 |
| 2,361,678 | De Lancey | Oct. 31, 1944 |
| 2,375,909 | Fawick | May 15, 1945 |